Oct. 9, 1951 W. F. BERCK 2,571,005
ADJUSTABLE GEARING
Filed July 20, 1946
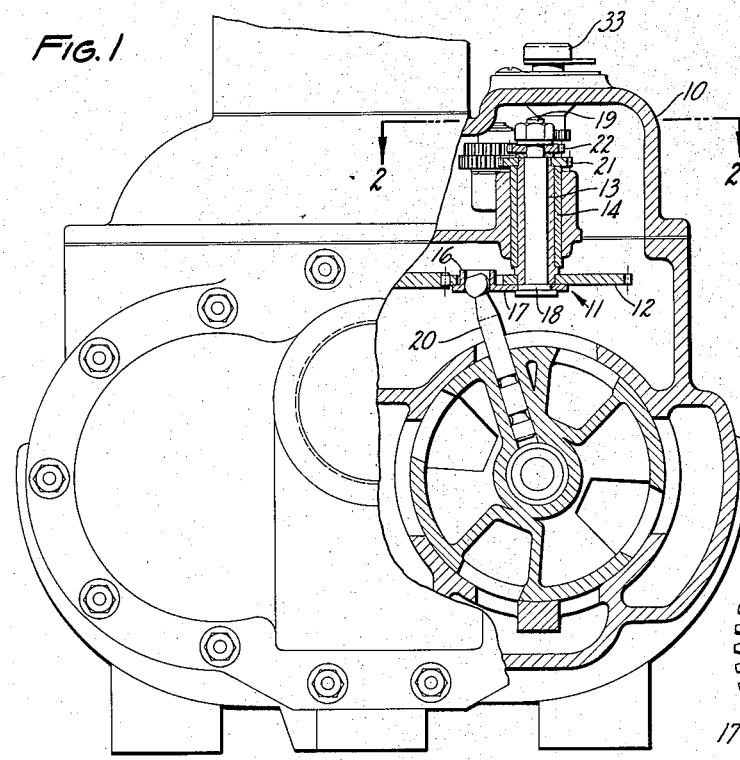
Fig. 1
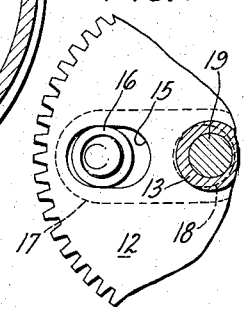
Fig. 5
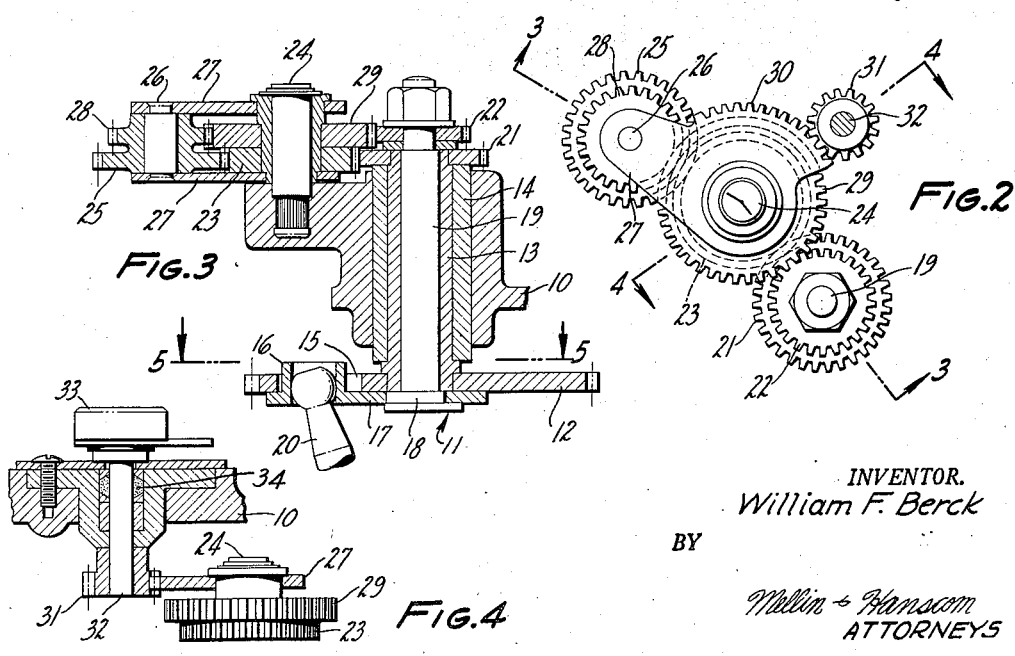
Fig. 3
Fig. 2
Fig. 4
INVENTOR.
William F. Berck
BY
Mellin & Hanscom
ATTORNEYS Patented Oct. 9, 1951

2,571,005

UNITED STATES PATENT OFFICE 2,571,005

ADJUSTABLE GEARING

William F. Berck, Hayward, Calif., assignor to Ralph N. Brodie Company, Oakland, Calif., a corporation of California Application July 20, 1946, Serial No. 685,070

4 Claims. (Cl. 74—395)

This invention relates to fluid meters, and more particularly to an adjustment mechanism for changing the capacity of such meters.

The primary object of the present invention is to provide an improved adjusting mechanism of the planetary type for infinitely varying the throw of a crank or eccentric forming part of a fluid meter.

In its general aspects, the invention contemplates the provision of a gear train between a crank device and an adjusting shaft for its crank pin, the crank device driving the adjusting shaft through the gearing in the same direction at a one to one gear ratio during non-planetary movement of the gear train elements to prevent adjustment or variation in the throw of the crank pin, and the crank device driving the adjusting shaft at a different ratio upon operation of the gear train as a planetary transmission, to provide infinite variations between limits in the throw of the crank pin. The adjustment may be made to occur as a result of manual or automatic control, as desired.

One form which the invention may assume is exemplified in the following description and illustrated by way of example in the accompanying drawings, in which:

Fig. 1 is a part elevational and part sectional view of a meter embodying the invention.

Fig. 2 is a view of the gear train, taken along the line 2—2 of Fig. 1.

Fig. 3 is a section taken along the line 3—3 of Fig. 2.

Fig. 4 is a view taken along the line 4—4 of Fig. 2.

Fig. 5 is a view taken along the line 5—5 of Fig. 3.

As shown in the drawings, the mechanism is mounted in a meter housing 10 and includes a crank or eccentric device 11 in the form of a gear 12 suitably secured to a hollow drive shaft 13 rotatable in a bearing 14 supported in the housing. A radial slot 15 is provided in the drive gear for reception of a hollow crank pin 16 whose crank arm 17 extends inwardly and encompasses an eccentric 18 secured to an adjusting shaft 19 extending through the hollow drive shaft 13. An arm 20 may project from the crank pin.

A first gear 21 is fixed to the hollow drive shaft 13 and a second gear 22 to the eccentric adjusting shaft 19, a gear train transmitting rotary motion between these two gears 21, 22 in the same direction and, normally, at a one to one gear ratio. This gear train includes a first idler 23 rotatably mounted on a suitably supported stud 24 and meshing with the first gear 21, and also with a first planet idler 25 rotatably supported on a shaft 26 fixed to and extending between planet arms of a carrier 27 rotatable about the axis of the stud 24. A second planet idler 28 is integral, or otherwise secured for rotation, with the first planet idler 25 and meshes with a second idler 29 rotatable on the stud 24 and meshing with the second gear 22 secured to the eccentric adjusting shaft 19.

The teeth on the first and second gears 21, 22 are different in number, which is also true of the teeth on the first and second planet idler pinions 25, 28. The first planet gear 25 has the same number of teeth as the first drive gear 21, and the second planet gear 28 has the same number of teeth as the second driven gear 22 on the adjusting shaft 19. Thus, when the planet carrier or arm 27 is stationary, the driving gear 21 rotates the driven gear 22 in the same direction and at the same rate of speed (one to one gear ratio).

So long as the driving and driven gears 21, 22 are rotating in the same direction and at the same speed, the position of the crank pin 16 in the crank slot 15 remains unchanged. During rotation of the main drive gear 12 on which the crank pin is mounted, rotation of the driving and driven gears 21, 22 at different speeds would cause rotation of the eccentric adjusting shaft 19 and its eccentric 18 with respect to the drive gear 12 and would produce movement of the crank arm 17 and its crank pin 16 radially of the crank drive gear, thereby changing the throw of the crank pin 16.

Adjustment of the crank pin occurs as the result of moving the planet carrier 27 about the axis of the idler stud 24 in one direction or the other, depending upon the desire to increase or decrease the throw of the crank pin. Such movement causes the idler gears to function as an epicyclic transmission; the first idler 23 serving as a driving sun gear, the second idler 29 as a driven sun gear, with the first and second compound planet idlers 25, 28 operating as planet pinions revoluble about the first and second sun gears 23, 29.

The planetary action of the gear train may be understood by considering the main gear 12 stationary, which holds the drive gear 21 and first idler 23 stationary as well. The pivoting of the planet carrier 27 about the stud 24 by any suitable means causes the first planet pinion 25 to roll on the stationary sun gear 23, and rotates both the first and second planet pinions 25, 28 about their own axis on the shaft 26. Since the planet pinions 25, 28 have different numbers of teeth, rotation of the planet arm 27 produces a differential action and causes the driven idler sun gear 29 to be rotated with respect to the stationary sun gear 23. Since the driven sun gear 29 meshes with the driven gear 22, the eccentric adjusting shaft 19 is rotated and the eccentric 18 turned with respect to the drive gear 12, moving the crank arm 17 along the face of the drive gear 12 in either an inward or outward direction, depending upon the direction in which the planet carrier 27 is rotated, and correspondingly shifting the position of the crank pin 16 in the radial slot 15.

Although the planetary action has been described in connection with a stationary drive gear 21 and idler sun gear 23, it is apparent that the planetary action resulting from rotation of the carrier 27 also occurs during operation of the meter and with the gears 12, 21, 23 turning. Depending upon the direction in which the planet carrier 27 is turned, and during such turning, the gear ratio between the drive gear 12 and eccentric adjusting shaft 19 becomes either greater or less than the normal operating ratio of one to one.

Rotation or pivotal movement of the planet carrier 27 about the axis of the idler sun gears 23, 29 may be produced in any suitable manner; either automatically, semi-automatically or manually. A manual adjustment is disclosed in the drawings, and includes the provision of a gear segment 30 on the carrier periphery meshing with a pinion 31 secured to an adjusting shaft 32 journaled in and projecting through the meter housing 10. This shaft has a suitable knob 33 secured to it exteriorly of the housing, by means of which the carrier may be rotated in either direction. There is suitable packing 34 about shaft 32 frictionally engaging the shaft with a force sufficient to prevent accidental movement of the shaft because of any forces transmitted thereto through the gear 31, yet allowing adjustment of shaft 32 by manipulation of knob 33.

While the invention has been described by way of illustration in connection with the adjustment in the throw of a crank pin, it is apparent that it can also be used in connection with the adjustment in the throw of an eccentric, or other eccentric devices. For example, the provision of a circular periphery on the crank arm 17 converts it to an outer eccentric, with an inner eccentric 18 rotatable in its bore. Rotation of the inner eccentric 18 relative to the drive gear 12, through manipulation of the adjusting mechanism heretofore described, shifts the outer eccentric 17 (crank arm) radial of the drive gear 12 and changes the throw imparted to an eccentric strap (not shown) encircling the outer eccentric.

From the foregoing it will be apparent that an apparatus has been provided capable of imparting infinitesimal and an infinite number of adjustments to the throw of a crank pin or eccentric, depending upon the planetary movement of the planet idlers.

While the present invention is herein disclosed in its preferred form, it is to be understood that various changes may be made therein by those skilled in the art without departing from the spirit of the invention as defined in the appended claims.

Having thus described my invention, what I claim and desire to secure by Letters Patent is:

1. In a device of the character described, a pair of concentric shafts, a first pair of coaxial dissimilar gears mounted on said shafts, a second pair of dissimilar coaxial gears meshing with the first pair of gears, a single compound gear having teeth meshing with the teeth of the second pair of gears whereby said second pair of gears and said compound gear form a train for the transmission of rotation from one gear of the first pair to the other gear of the first pair, and means for bodily moving the compound gear with respect to the second pair of gears to vary the relative angularity of the concentric shafts.

2. The structure set forth in claim 1, in which the dissimilarity between the gears of the first pair of gears is equal and opposite to the dissimilarity between the gears of the second pair.

3. The structure set forth in claim 1, in which the axes of the first pair of gears and the second pair of gears are relatively fixed.

4. The structure set forth in claim 1, in which the axis of the compound gear is movable with respect to the axis of the second pair of gears.

WILLIAM F. BERCK.

REFERENCES CITED

The following references are of record in the file of this patent:

UNITED STATES PATENTS

| Number | Name | Date |
|---|---|---|
| 1,708,022 | Lorenz | Apr. 9, 1929 |
| 1,920,988 | King | Aug. 8, 1933 |
| 1,949,510 | Woodward | Mar. 6, 1934 |

FOREIGN PATENTS

| Number | Country | Date |
|---|---|---|
| 365,822 | Italy | Dec. 13, 1938 |
| 406,324 | Germany | Nov. 22, 1924 |